United States Patent
Johansson et al.

(10) Patent No.: US 7,077,430 B2
(45) Date of Patent: Jul. 18, 2006

(54) VEHICLE COMPRISING A SEAT FITTED IN THE TRANSVERSE DIRECTION OF THE VEHICLE

(75) Inventors: Glenn Johansson, Gothenburg (SE); Ulf Torgilsman, Grabo (SE); Alf Hakansson, Torslanda (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/906,459

(22) Filed: Feb. 21, 2005

(65) Prior Publication Data
US 2005/0127654 A1 Jun. 16, 2005

Related U.S. Application Data

(63) Continuation of application No. PCT/SE03/01283, filed on Aug. 18, 2003.

(30) Foreign Application Priority Data
Aug. 21, 2002 (SE) .................................. 0202468

(51) Int. Cl.
*B60R 21/06* (2006.01)

(52) U.S. Cl. ................................... 280/748; 297/216.1

(58) Field of Classification Search ............... 280/748, 280/749, 730.1; 297/216.1, 212.1, 216.16
See application file for complete search history.

(56) References Cited

U.S. PATENT DOCUMENTS

| | | | | |
|---|---|---|---|---|
| 3,314,720 A | * | 4/1967 | Millington et al. ...... 297/216.1 |
| 5,026,006 A | * | 6/1991 | Tinder et al. ......... 244/122 AG |
| 5,707,075 A | * | 1/1998 | Kraft et al. .............. 280/730.2 |
| 6,042,190 A | * | 3/2000 | Mathe et al. ................ 297/483 |
| 6,672,619 B1 | * | 1/2004 | Ennerdal et al. ............ 280/749 |
| 2004/0012183 A1 | * | 1/2004 | Jessup et al. ............... 280/748 |

FOREIGN PATENT DOCUMENTS

GB 2341356 A * 3/2000

\* cited by examiner

*Primary Examiner*—David R. Dunn
(74) *Attorney, Agent, or Firm*—Novak Druce & Quigg, LLP

(57) ABSTRACT

A vehicle including a seat fitted in the transverse direction of the vehicle for a passenger traveling sideways. A seatbelt (12) is provided and designed for securing the passenger to the seat (11). A restraining structure (15) runs in the transverse direction (10) of the vehicle and which is arranged in front of, and immediately adjacent to, the seat (11). The restraining structure (15) checks or restrains the movement of the passenger's head and upper body in the event of a collision. The seat (11) has a first forward slide safeguard (21) arranged on a seat cushion (16) forming part of the seat close alongside the restraining structure (15). The forward slide safeguard (21) has a sloping section (22) that forms an upwardly inclined ramp in the forwards direction (7) of the vehicle. The forward slide safeguard is designed to check the movement of the passenger's hip in the event of a collision. A second threshold-shaped forward slide safeguard (23) is arranged on the floor (37) of the vehicle for checking movement of the passenger's feet in the event of a collision.

12 Claims, 4 Drawing Sheets

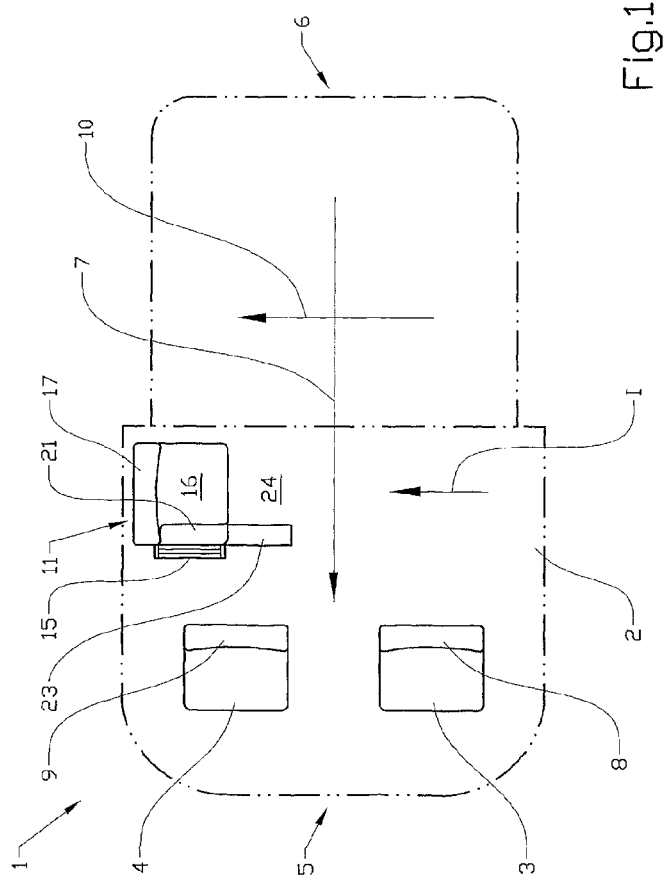
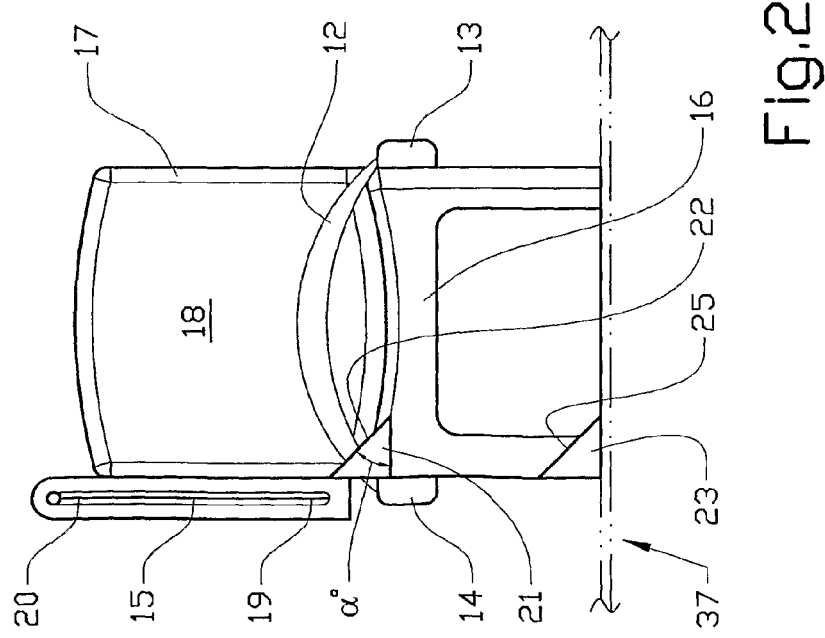

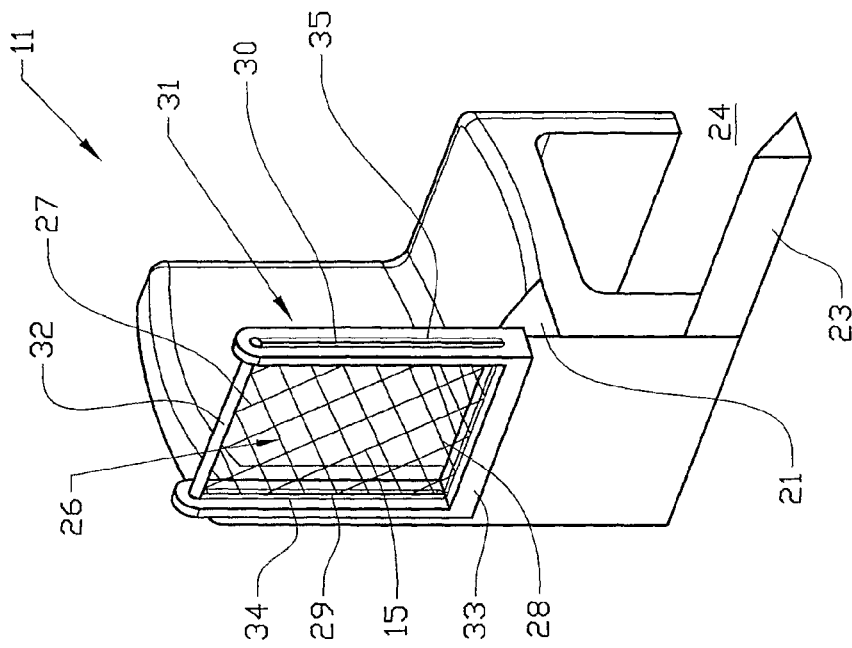
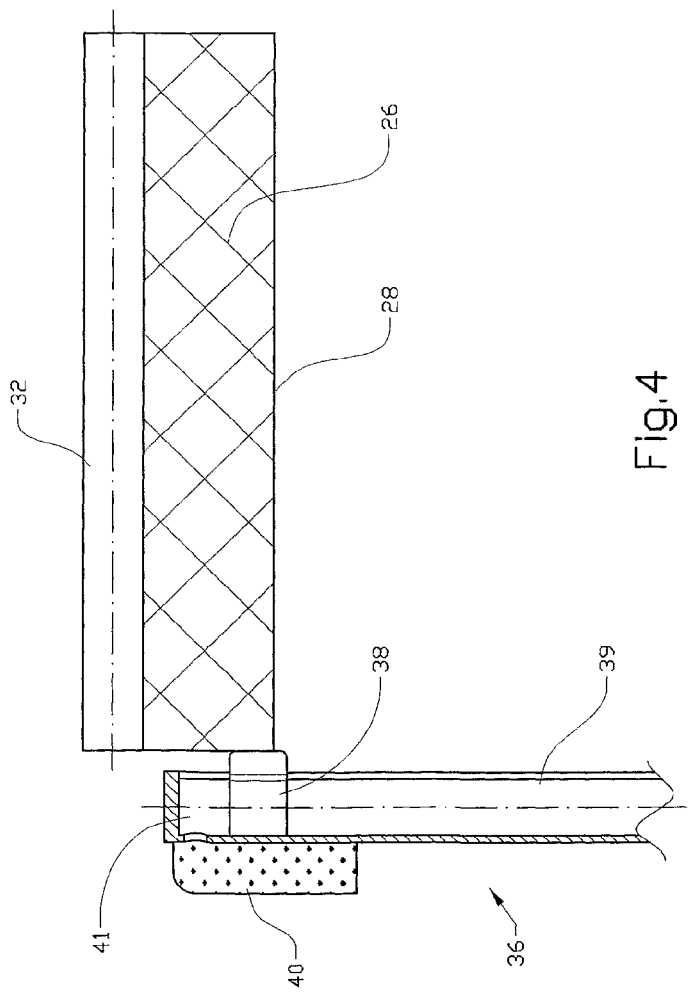

VEHICLE COMPRISING A SEAT FITTED IN THE TRANSVERSE DIRECTION OF THE VEHICLE

CROSS-REFERENCE TO RELATED APPLICATIONS

The present application is a continuation patent application of International Application No. PCT/SE03/01283 filed 18 Aug. 2003 which was published in English pursuant to Article 21(2) of the Patent Cooperation Treaty, and which claims priority to Swedish Application No. 0202468-5 filed 21 Aug. 2002. Said applications are expressly incorporated herein by reference in their entireties.

TECHNICAL FIELD

The invention relates to a vehicle that includes a seat fitted in the transverse direction of the vehicle, together with a seatbelt that is designed for securing the passenger to the seat. The seat is intended for a passenger traveling sideways.

BACKGROUND OF THE INVENTION

In certain types of vehicles, seats are fitted in the transverse direction of the vehicle and the passengers are traveling essentially sideways, transverse to the normal direction of travel of the vehicle. On seats of this type, a two or three-point seatbelt is usually fitted in order to prevent a passenger from being thrown out in the event of a collision. Three-point belts are mainly intended to act in conjunction with a seat structure fitted in the forwards direction of the vehicle. The belt is therefore designed to check the movement of the passenger's upper body in the event of a collision. The design of the belt prevents the passenger's upper body from being thrown or doubled forwards. If the seat is fitted in the transverse direction of the vehicle, there is a risk of the passenger slipping out of the three-point belt in the event of a head-on collision.

There is therefore a need to improve the safety of passengers traveling in the transverse direction of the vehicle.

DISCLOSURE OF THE INVENTION

An object of the invention is to provide a vehicle that affords greater safety for passengers traveling in a seat fitted in the transverse direction of the vehicle for a passenger traveling sideways.

According to the invention, such a vehicle includes a restraining structure running in the transverse direction of the vehicle that is arranged in front of, and immediately adjacent to the seat in the forwards direction of the vehicle. The restraining structure thus forms a barrier which runs in the transverse direction of the vehicle. The barrier preferably forms an essentially planar wall. The location of the structure ensures that the movement of the passenger's head and upper body are checked by the restraining structure in the event of a collision. The fact that the restraining structure is located immediately adjacent the seat ensures that the relative movement between passenger and restraining structure in the event of a crash remains small. A restraining structure is in this case designed to check the movement of a passenger in the event of a collision.

The term restraining structure relates to a cushioning or solid structure. The term cushioning structure relates to an energy-absorbing structure which in a collision checks the movement of a passenger with sufficient flexibility to meet the side impact standards for passenger cars ECER-95 or FMVSS-214. Suitable materials for the design of a cushioning structure will be well-known to a person skilled in the art. According to various embodiments of the invention, the cushioning structure comprises (includes, but is not necessarily limited to) a mesh, an expandable airbag or a surface layer of deformable material. The term solid structure relates to a structure that does not yield significantly under the forces to which the structure is subjected by a passenger in the event of a collision. Solid structures may consist, for example, of wood, Perspex, plastic or sheet metal. The fact that the solid structure is located close alongside the seat ensures that the passenger already has contact with the solid structure right from the initial development of a collision sequence. This reduces the occurrence of hard impacts for the passenger.

In a first preferred embodiment, the seat is provided with a first forward slide safeguard arranged on a seat cushion forming part of the seat close alongside the cushioning structure. The first forward slide safeguard includes a sloping section that forms an upwardly inclined ramp in the forwards direction of the vehicle. The first forward slide safeguard is in this way designed to check (restrain) the movement of the passenger's hip in the event of a collision.

In a second preferred embodiment the vehicle is provided with a second threshold-shaped forward slide safeguard which is arranged on the floor of the vehicle and extends in the transverse direction of the vehicle in a leg space located in front of the seat in the transverse direction of the vehicle. The second forward slide safeguard is designed to check the movement of the passenger's feet in the event of a collision.

In an especially preferred embodiment, the restraining structure consists of a cushioning structure. The movement of the passenger can thereby be gently checked and restrained.

In an alternative embodiment of the invention the restraining structure consists of a solid structure. In this case it is important that the passenger sit close up against the solid structure when the passenger assumes a correct sitting position on the seat. Where solid structures are employed, the passenger's shoulder should rest against the solid structure when normally located.

BRIEF DESCRIPTION OF DRAWINGS

The invention will be described in more detail below with reference to the attached drawings, and in which:

FIG. 1 is a diagrammatic top view of a vehicle that is equipped with a seat fitted in the transverse direction of the vehicle;

FIG. 2 is a front elevational view of the transversely-fitted seat of FIG. 1, viewed in the direction I (from the front of the seat);

FIG. 3 is a perspective view of the transversely-fitted seat of FIG. 1;

FIG. 4 is a partial cross-sectional view showing an extendible, flexible layer material that is designed to be activated by a pyrotechnic deployment device;

DETAILED DESCRIPTION OF THE INVENTION

Figure 5:
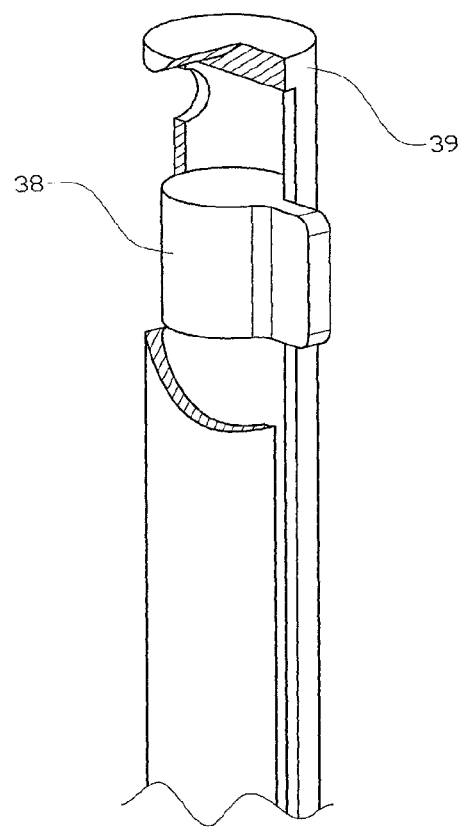
FIG. 5 is a perspective, partial cross-sectional view showing details of the pyrotechnic deployment device of FIG. 4.

FIG. 1 shows a vehicle 1 viewed from above. In this example, the vehicle 1 consists of a truck with a cab 2. The vehicle 1 has a front part 5 and a rear part 6. The vehicle 1 thus extends in a longitudinal direction, indicated by the arrow 7, between its rear part 6 and its front part 7. The normal direction of travel of the vehicle corresponds to the longitudinal direction 7 of the vehicle. In the cab 2, a driver's seat 3 and a passenger's seat 4 are conventionally arranged with backrests 8, 9 which face forwards in the longitudinal direction 7 of the vehicle. The vehicle 1 also comprises a seat in the form of a passenger seat 11 arranged in the transverse direction of the vehicle, which is indicated by the arrow 10.

The transversely fitted seat 11 has a seatbelt 12 (FIG. 2) designed for securing a passenger to the seat. The seatbelt is of conventional type and will not be further described. The seatbelt 12 is fixed to the seat in a known manner, or where necessary, is fixed to anchoring structures 13, 14 (FIG. 2) arranged at the side of the seat. The term transverse direction generally signifies a direction at right-angles to the longitudinal direction of the vehicle. The term transverse direction also includes slight deviations of less than ±10° from a direction at right-angles to the longitudinal direction of the vehicle.

According to the invention the vehicle 1 furthermore has a restraining structure 15 running in the transverse direction 10 of the vehicle which is arranged in front of and immediately adjacent to the seat 11 in the forwards direction 7 of the vehicle. The term "in front of and immediately adjacent to the seat 11" implies that a passenger sits close alongside the restraining structure 15 when he assumes a correct sitting position on the seat. The restraining structure forms a vertical wall which extends in a vertical direction from what is the front edge of the seat 11 in the direction of the vehicle, or at a short interval (distance) preferably less than 5 cm from the front edge of the seat.

According to what has been stated above, the term restraining structure relates to a cushioning or solid structure. A restraining structure is in this case designed to check the movement of a passenger in the event of a collision. The term cushioning structure relates to an energy-absorbing object which in a collision checks the movement of a passenger with sufficient flexibility to meet the side impact standards for passenger cars ECER-95 or FMVSS-214. Suitable materials for the design of a cushioning structure will be well-known to a person skilled in the art. According to various embodiments of the invention the cushioning structure consists of a mesh, an expandable airbag or a surface layer of deformable material. The term solid structure relates to a structure that does not yield significantly under the forces to which the structure is subjected by a passenger in the event of a collision. Solid structures may consist, for example, of wood, Perspex, plastic or sheet metal.

The restraining structure extends for a distance in the vertical direction of the vehicle which is equal to or preferably somewhat greater than the distance from the passenger's hip to the top of the passenger's head. The restraining structure extends for a distance in the transverse direction of the vehicle which allows the structure to check the movement of the passenger either when the passenger is sitting inclined slightly forwards or when the passenger is resting against a backrest fitted to the seat.

The passenger's shoulder preferably rests against the position of the restraining structure in the normal location. The restraining structure is preferably designed as a cushioning structure. Where the cushioning structure consists of an extendible, flexible layer material, such as a mesh, for example, a woven or knitted fabric, a fiber material or other suitable material, which is designed to be drawn out by means of a pyrotechnic deployment device, the cushioning structure is preferably located at a short distance of between 0.5 and 4.0 cm from what is the passenger's front shoulder in the direction of the vehicle, thereby reducing the risk of the mesh striking his shoulder when it is drawn out. The cushioning structure 15 is thereby designed to check the movement of the passenger's head and upper body in the event of a collision. The transversely facing seat 11 furthermore has a seat cushion 16 and a backrest 17. Saying that the seat is located in the transverse direction of the vehicle signifies that the backrest 17 has a front surface 18 which essentially faces in the transverse direction of the vehicle. In its vertical extent, the cushioning structure 15 comprises at least a lower part 19 adjoining the sitting surface 16 of the seat and an upper part 20, which preferably extends a short distance above the upper part of the backrest 17, so that the cushioning structure is capable of checking the movement of a passenger's head and upper body.

The seat 11 furthermore has a first forward slide safeguard 21 arranged on a seat cushion 16 of the seat close alongside the said cushioning structure 15. The forward slide safeguard 21 preferably extends along the entire length of the seat 16 in the transverse direction 10 and is arranged on an outer part of the seat in the forward direction 7 of the vehicle. The forward slide safeguard 21 comprises a sloping section 22 (FIG. 2) which forms an upwardly inclined ramp in the forwards direction 7 of the vehicle. In order to afford sufficient resistance to forward sliding, the ramp has an angle $\alpha$ of more than 30° to the horizontal plane. The angle is preferably between 40 and 50°. The vertical extent of the ramp furthermore exceeds 6 cm. The ramp preferably has a height of between 8 and 12 cm. The forward slide safeguard is thereby designed to check the movement of the passenger's hip in the event of a collision.

The vehicle furthermore comprises a second threshold-shaped forward slide safeguard 23, which is arranged on the floor 37 of the vehicle and extends in the transverse direction of the vehicle at a leg space 24 located in front of the seat in the transverse direction of the vehicle. The leg space 24 is conventionally located directly in front of the seat 16. According to one embodiment of the invention, the second forward slide safeguard 23 comprises a sloping section 25, which forms an upwardly inclined ramp in the forwards direction of the vehicle. In order to afford sufficient resistance to forward sliding, the ramp has an angle $\alpha$ of more than 40° to the horizontal plane. The ramp may also be perpendicular to the floor section or be designed with an overhang towards the leg space. The vertical extent of the ramp furthermore exceeds 8 cm. The ramp preferably has a height of between 12 and 16 cm. The second forward slide safeguard is designed to check the movement of the passenger's feet in the event of a collision.

FIG. 3 shows a perspective view of one embodiment of a transversely fitted seat 11 with a cushioning structure 15, which consists of a flexible layer material 26, such as a mesh, a fiber material or a piece of fabric, for example. In the example shown, a mesh 26 is used. The mesh 26 has an upper end 27, a lower end 28 and two edge pieces 29, 30. The flexible layer material is deployed in a support frame 31. In its upper part, the support frame has a roller blind arrangement 32 that is designed to allow the flexible layer material 26 to be drawn out and fixed to the lower part 33 of the support frame in the deployed position. According to one embodiment, the edge pieces 29, 30 of the flexible layer material can be anchored in guide elements 34, 35, which preferably run vertically. This embodiment is preferred where the roller blind arrangement comprises a pyrotechnic unit 36 (FIG. 4) that is designed to draw the mesh out into a deployed position in the event of a collision. The roller blind arrangement can also be designed to feed out in a horizontal direction.

A roller blind arrangement which comprises a pyrotechnic unit 36 designed to draw the mesh out into a deployed position in the event of a collision is shown in more detail in FIGS. 4 and 5. FIG. 4 shows a roller blind arrangement 32 which carries a roller blind in the form of a rolled flexible layer material 26. The lower end 28 of the roller blind is fixed to a piston 38 in the pyrotechnic unit 36. The piston 38 is arranged in a partially slotted cylinder 39. A charge 40 is arranged in a known manner in order to supply an enclosed space 41 above the piston 38 with pressurized gas so that the roller blind is drawn out. FIG. 5 shows a detailed view of the piston 38 and the partially slotted cylinder.

Figure 6:
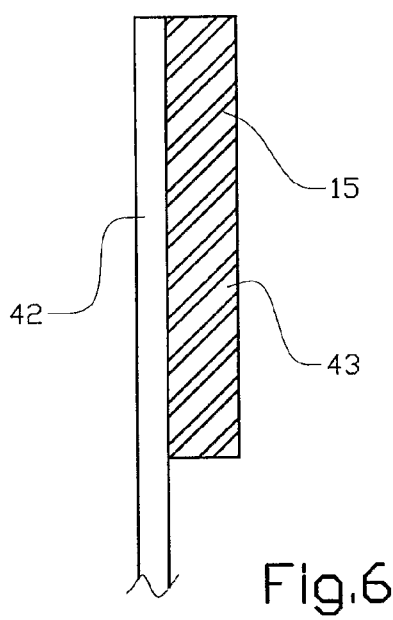
FIG. 6 is a cross-sectional view of a cushioning structure formed by a solid structure having a surface layer of a deformable material.

FIG. 6 shows an alternative embodiment of the cushioning structure 15. In this embodiment the cushioning structure 15 comprises an underlying solid structure 42 running in the transverse direction of the vehicle and having a surface layer 43 of a deformable material that is designed to absorb energy during the deformation.

Figure 7:
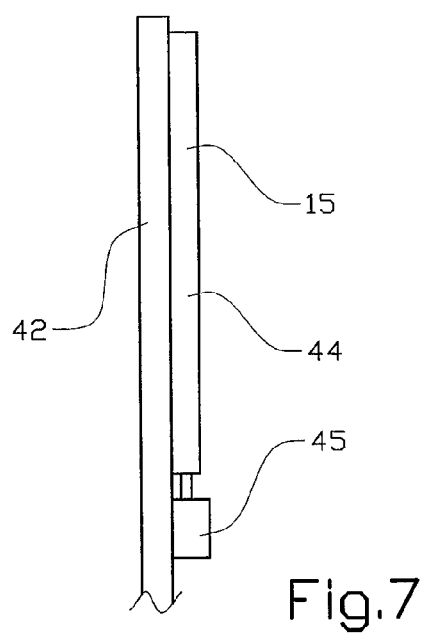
FIG. 7 shows a cushioning structure which consists of a solid structure with a surface-mounted airbag.

In one embodiment as shown in FIG. 7, the deformable material consists of an airbag 44, which is expanded by means of pressurized gas from a gas unit 45.

Figure 8:
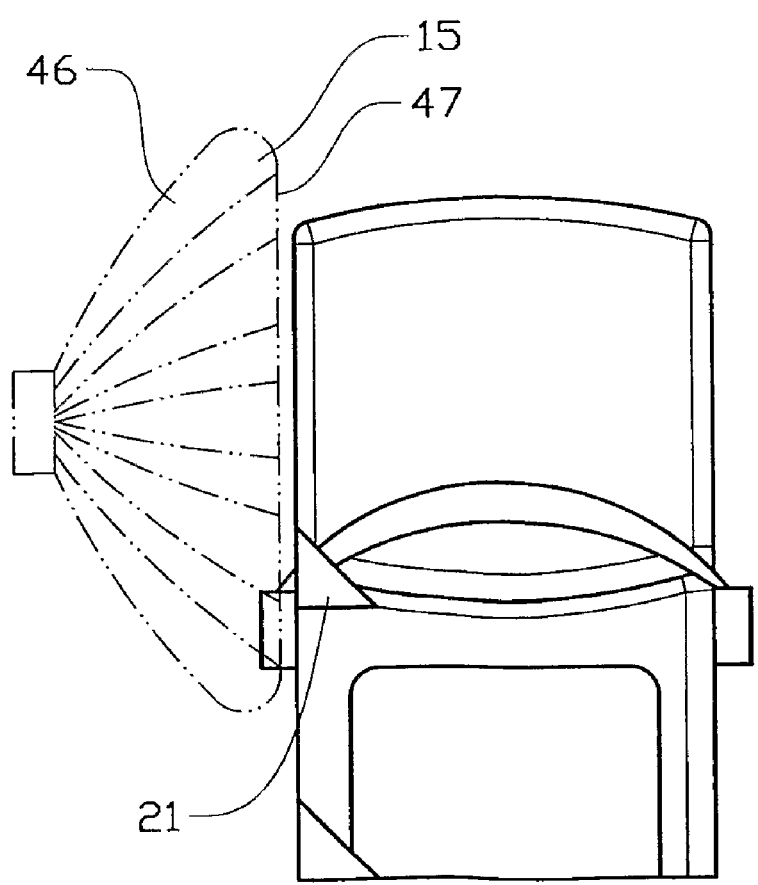
FIG. 8 shows a front elevational view of a transversely-fitted seat in which the cushioning structure consists of an airbag.

FIG. 8 shows an embodiment of the invention in which the cushioning structure 15 consists of an airbag 46 designed to form a barrier 47 which covers the passenger's upper body and head.

In an alternative embodiment of the invention, the restraining structure consists of a solid structure. In this case, it is of the greatest importance that the passenger should sit close up against the solid structure when the passenger assumes a correct sitting position on the seat. Where solid structures are employed, the passenger's shoulder should rest against the position of the solid structure in the normal location. This embodiment is similar to the cushioning structure shown in FIG. 6. The embodiment does not have the deformable surface layer shown in FIG. 6. The solid structure is furthermore fitted some distance, essentially equal to the thickness of the deformable surface layer, closer to the seat, so that the passenger sits close up against the solid structure when he assumes a correct sitting position on the seat.

The invention is not limited to the embodiments specified above but can be modified within the scope of the patent claims. In particular, the invention can be used on all types of vehicles with seats fitted in the transverse direction, such as buses, trains, cars, ships and aircraft, for example.

What is claimed is:

1. A vehicle (1) comprising a seat (11) oriented in the transverse direction (10) of the vehicle for a passenger traveling sideways, and a seatbelt (12) which secures the passenger to the seat (11), the vehicle (1) further comprising a restraining structure (15) running in the transverse direction (10) of the vehicle which is arranged in front of and immediately adjacent to the seat (11) in the forwards direction (7) of the vehicle, said restraining structure (15) configured to check the movement of the passenger's head and upper body in the event of a collision and wherein the vehicle (1) further comprises a second threshold-shaped forward slide safeguard (23) arranged on the floor (37) of the vehicle and extending in the transverse direction (10) of the vehicle in a leg space (24) located in front of the seat (11) in the transverse direction (10) of the vehicle, said second forward slide safeguard (23) configured to check movement of the passenger's feet in the event of a collision.

2. The vehicle as recited in claim 1, wherein the seat (11) has a first forward slide safeguard (21) arranged on a seat cushion (16) forming part of the seat close alongside said restraining structure (15), wherein the forward slide safeguard (21) comprises a sloping section (22) which forms an upwardly inclined ramp in the forwards direction (7) of the vehicle, said forward slide safeguard being designed to check the movement of the passenger's hip in the event of a collision.

3. The vehicle as recited in claim 1, wherein the second forward slide safeguard (23) further comprises a sloping section (25) that forms an upwardly inclined ramp in the forward direction of the vehicle.

4. The vehicle as recited in claim 1, wherein said restraining structure consists of a cushioning structure (15).

5. The vehicle as recited in claim 4, wherein said cushioning structure (15) consists of a flexible sheet material (26).

6. The vehicle as recited in claim 5, wherein said flexible sheet material (26) is one of a mesh, a fiber material and a piece of fabric.

7. The vehicle as claimed in claim 5, wherein said flexible sheet material (26) is extendibly arranged in a roller blind structure (32).

8. The vehicle as recited in claim 7, further comprising a pyrotechnic unit (36) configured to draw the flexible layer material (26) out into a deployed position in the event of a collision.

9. The vehicle as recited in claim 4, wherein said cushioning structure (15) is constructed from an underlying solid structure (42) running in the transverse direction of the vehicle and having a surface layer (43) of deformable material configured to absorb energy during deformation of the material.

10. The vehicle as recited in claim 9, wherein said deformable material (43) consists of an airbag.

11. The vehicle as recited in claim 4, wherein said cushioning structure (15) consists of an airbag (46).

12. The vehicle as recited in claim 1, wherein said restraining structure (15) consists of a solid structure (40) running in the transverse direction of the vehicle, and said solid structure is located in relation to said seat (11) so that a passenger sits close alongside and with a shoulder resting against the solid structure (40) when the passenger assumes a sifting position on the seat (11) dictated by the seatbelt (12).

* * * * *